United States Patent
Aghabeigi et al.

(10) Patent No.: US 10,515,468 B2
(45) Date of Patent: Dec. 24, 2019

(54) CHARTING A LARGE NUMBER OF DATA INPUTS

(71) Applicant: SAP SE, Walldorf (DE)

(72) Inventors: Bardia Aghabeigi, Vancouver (CA); Geoffrey Neil Peters, Vancouver (CA)

(73) Assignee: SAP SE, Walldorf (DE)

( * ) Notice: Subject to any disclaimer, the term of this patent is extended or adjusted under 35 U.S.C. 154(b) by 366 days.

(21) Appl. No.: 15/384,612

(22) Filed: Dec. 20, 2016

(65) Prior Publication Data

US 2018/0174336 A1   Jun. 21, 2018

(51) Int. Cl.
  *G06F 3/00* (2006.01)
  *G06T 11/20* (2006.01)
  *G06F 3/0485* (2013.01)
  *G06F 3/01* (2006.01)

(52) U.S. Cl.
  CPC .......... *G06T 11/206* (2013.01); *G06F 3/0485* (2013.01)

(58) Field of Classification Search
  None
  See application file for complete search history.

(56) References Cited

U.S. PATENT DOCUMENTS

| | | | | |
|---|---|---|---|---|
| 2010/0309153 A1* | 12/2010 | Terada | .............. | G06F 3/0488 345/173 |
| 2012/0041328 A1* | 2/2012 | Rajagopalan | ........ | A61B 5/0452 600/523 |
| 2012/0084231 A1* | 4/2012 | McNaught | ......... | G06Q 30/0283 705/400 |
| 2012/0173215 A1* | 7/2012 | Buchan | ................. | G06Q 10/06 703/6 |
| 2013/0104071 A1* | 4/2013 | Boutoussov | ........ | G06F 3/04847 715/781 |
| 2014/0089801 A1* | 3/2014 | Agrawal | ............... | G06F 3/0484 715/719 |
| 2015/0067568 A1* | 3/2015 | Lee | ..................... | G06F 3/04842 715/771 |
| 2015/0220504 A1* | 8/2015 | Bocanegra Alvarez | | G06F 17/241 715/233 |
| 2017/0109820 A1* | 4/2017 | Baker | ................... | G06T 11/206 |
| 2017/0123643 A1* | 5/2017 | Berns | ..................... | G06F 9/453 |
| 2018/0004784 A1* | 1/2018 | Tompkins | .......... | G06F 16/2457 |

* cited by examiner

*Primary Examiner* — Toan H Vu
(74) *Attorney, Agent, or Firm* — Buckley, Maschoff & Talwalkar LLC

(57) ABSTRACT

A system, method, and computer-readable medium to receive a request to render a visualization, the visualization to include a plurality of data point representations; determine an optimal number of data point representations to include on a first page of the visualization; render an active range of the plurality of data point representations on the first page of the visualization; apply at least one post-rendering optimization to the rendered first page; determine an estimation of an application of the at least one post-rendering optimization to a next page of the visualization; store the estimation of the application of at the least one post-rendering optimization to the next page of the visualization in a buffer memory; and display the rendered first page having the at least one post-rendering optimization applied thereto.

19 Claims, 5 Drawing Sheets

CHARTING A LARGE NUMBER OF DATA INPUTS

BACKGROUND

Enterprise software systems receive, generate, and store data related to many aspects of an enterprise. Reporting tools may access the data and present the data in a variety of graphic visualizations, including different types and formats of graphs. The visualizations might be used by consumers thereof to gain insights into the operations of the enterprise and/or other purposes.

Conventional reporting tools provide many types of visualizations for graphically presenting values of one or more measures. However, more efficient systems and methods are desired to generate useable visualizations involving large numbers of data points.

DETAILED DESCRIPTION

The following description is provided to enable any person in the art to make and use the described embodiments. Various modifications, however, will remain readily apparent to those in the art.

In some example contexts, use-cases, and embodiments, one or more terms will be used in the present disclosure. As a matter of introduction and to ease the understanding of the present disclosure, a number of terms will be introduced, where the full meaning of the following terms will be further understood in context of the disclosure herein, on the whole.

Figure 1:
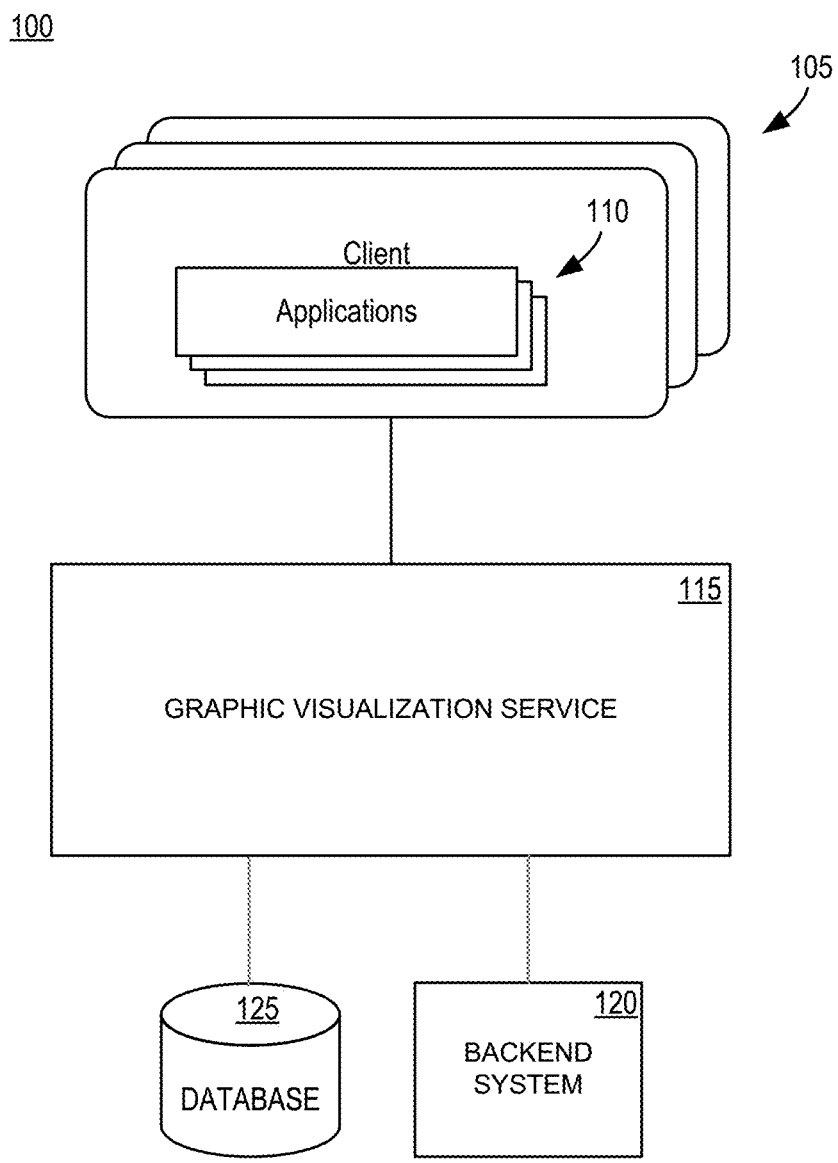
FIG. 1 is an example block diagram of a system architecture.

FIG. 1 is an illustrative block diagram of an architecture or system 100, in one example, Examples of some embodiments of the present disclosure are not limited to the particular architecture 100 shown in FIG. 1. System 100 includes one or more client devices 105 running one or more applications 110. Applications 110 may, in some embodiments, include a suite of different software applications having, at least to some extent, related functionality, similar user interfaces, and some ability to exchange data with each other. Applications 110 may include different software applications that support the operations and process of an organization. In some embodiments, one of the applications 110 may include functionality or a tool to define and create of graphic visualizations. In some embodiments, applications 110 may be configured to facilitate, support, and execute a program to request one or more graphic visualizations (also referred to herein as charts and simply, visualizations). The visualizations created and processed herein may be implemented by an application.

System 100 includes a graphic visualization service or server 115. In some embodiments, a functionality or service for creating and rendering visualizations including one or more different types of may be deployed as a cloud-based service, whereas in some other embodiments system 100 may include a client-server architecture. System 100 may encompass both scenarios. In the instance system 100 includes a server at 115, the devices at 105 may be client devices running applications as discussed above. In an instance system includes a cloud-based server at 115, the devices at 105 may execute a browser that is used by a user to interface with service 115.

System 100 further includes a backend system that can, automatically in some instances, in response to a request or call from graphic visualization service 115, execute tasks, code, or instructions to perform a process to create and/or support the creation and rendering of visualizations managed, at least in part, thereby. In some aspects herein, a user may provide an indication or request the rendering of one or more visualizations, as implemented in an application 110 and/or server or service 115, which may operate in cooperation with the processing of a backend system 120 to generate a program or response to effectuate the color synchronization control that may be used in rendering the requested visualizations where like dimensions have the same color renderings.

In one example, a client 105 executes an application 110 to present one or more visualizations via a user interface (UI) to a user on a display of client 105. The user manipulates UI elements within the UI to indicate and specify a visualization and/or dimensions to include in a desired visualization, where a server or service 115 embodying the graphic visualization service operates, in cooperation with backend system 120 and database 125 to generate, for example, a graphic visualization that efficiently and quickly renders one or more charts including a relevant portion of a range of data spanning a plurality of data points.

Data store 125 may comprise any data source or sources that are now known or become known. Data store 125 may comprise a relational database, a HTML document, an eXtendable Markup Language (XML) document, or any other data storage system storing structured and/or unstructured data files. The data of data store 130 may be distributed among several data sources. Embodiments are not limited to any number or types of data sources.

Data store 125 may implement an "in-memory" database, where a full database is stored in volatile (e.g., non-disk-based) memory (e.g., Random Access Memory). The full database may be persisted in and/or backed up to fixed disks (not shown). Embodiments herein are not limited to an in-memory implementation. For example, data may be stored in Random Access Memory (e.g., cache memory for storing recently-used data) and other forms of solid state memory and/or one or more fixed disks (e.g., persistent memory for storing their respective portions of the full database).

In accordance with some aspects of the present disclosure, a graphic visualization service or application herein provides a mechanism and environment that supports the creation and rendering of visualization of large sets of data including a plurality of data points. The plurality of data points may typically exceed a number that might, to a legible extent, all be contained in a single view of the data. In some aspects of the present disclosure, the method and systems herein can use in various combinations one or more of an incremental rendering, buffering, paging, and scrolling techniques, of visualizations to more efficiently create and interact with visualizations including a large number of data points.

Figure 2:
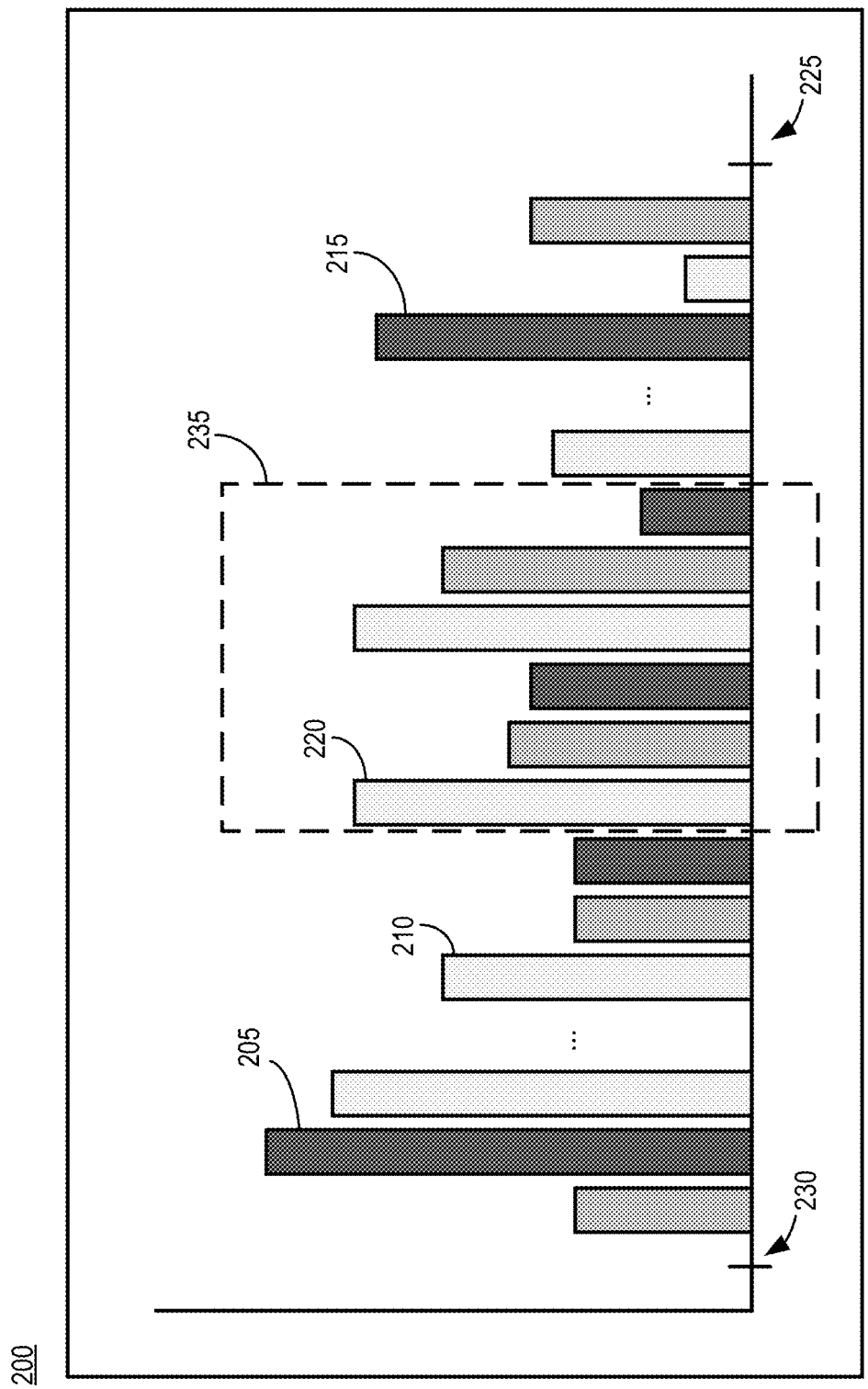
FIG. 2 is an example depiction of a range of data points.

FIG. 2 is an illustrative depiction of a range of data including a large number of data points. As used herein, a large number of data points may vary in the exact number of data points referred to but, in general, refers to a set of data points that cannot be practicably contained in a single visualization. In some embodiments, limiting factors contributing to all of the data points not being reasonably, or even practicably, contained at a same time in a single visualization might include, for example, the amount of resources required to render such a visualization in an acceptable amount or time, the amount of resources (e.g., memory requirements, processing bandwidth, etc.) to create and render such a visualization, a practical legibility of a visualization including all of the data point, and other considerations.

FIG. 2 includes a range of data 200. The range of data may include, for example, a very large number of data points such as, for example, 1,000; 10,000; and 100,000 data points. The different data points are depicted as data point representations in FIG. 1, similar to how the data points may be presented in a visualization of a chart herein. In the example of FIG. 2, the data points are represented by, for example, bars 205, 210, 215, and 220. The data point representations in FIG. 2 are meant to represent a large number of data points such as 100 or more data points. Importantly, the number of data points cannot be easily, efficiently or quickly rendered by traditional means. The range of data points extending from location 225 to 230 in the visualization of FIG. 2 may include 1000 data points.

FIG. 2 further includes a display window or viewport through which a portion of the range 200 of data may be visible to a user via a user interface (UI) of a system or apparatus. Display window 235 might be able to contain an amount of data points that can be reasonably or practicably presented in a visualization in an acceptable amount of time using an acceptable quantity of resources (e.g., memory, processing cycles, etc.). In some embodiments, the data points contained in or otherwise designated by a display window or viewport 235 will be considered an "active" range and only the data points in an active range might be rendered in some scenarios. That is, while all of the data in range 200 is valid and might potentially be included in a visualization, only the data points in the active range as indicated by viewport 235 that provides a view onto the data will be rendered in response to a request for a visualization.

In some embodiments, a user (or other entity such as an application or service) requesting a visualization might make the request including or in association with the full extent of the range of data 200. However, some embodiments herein might render only a portion of the full range of data at any one time. In some regards, savings may be realized with respect to the amount of resources used and/or required to render less than all of the data points in response to a visualization concerning all of the data points in the full range of data.

Figure 3:
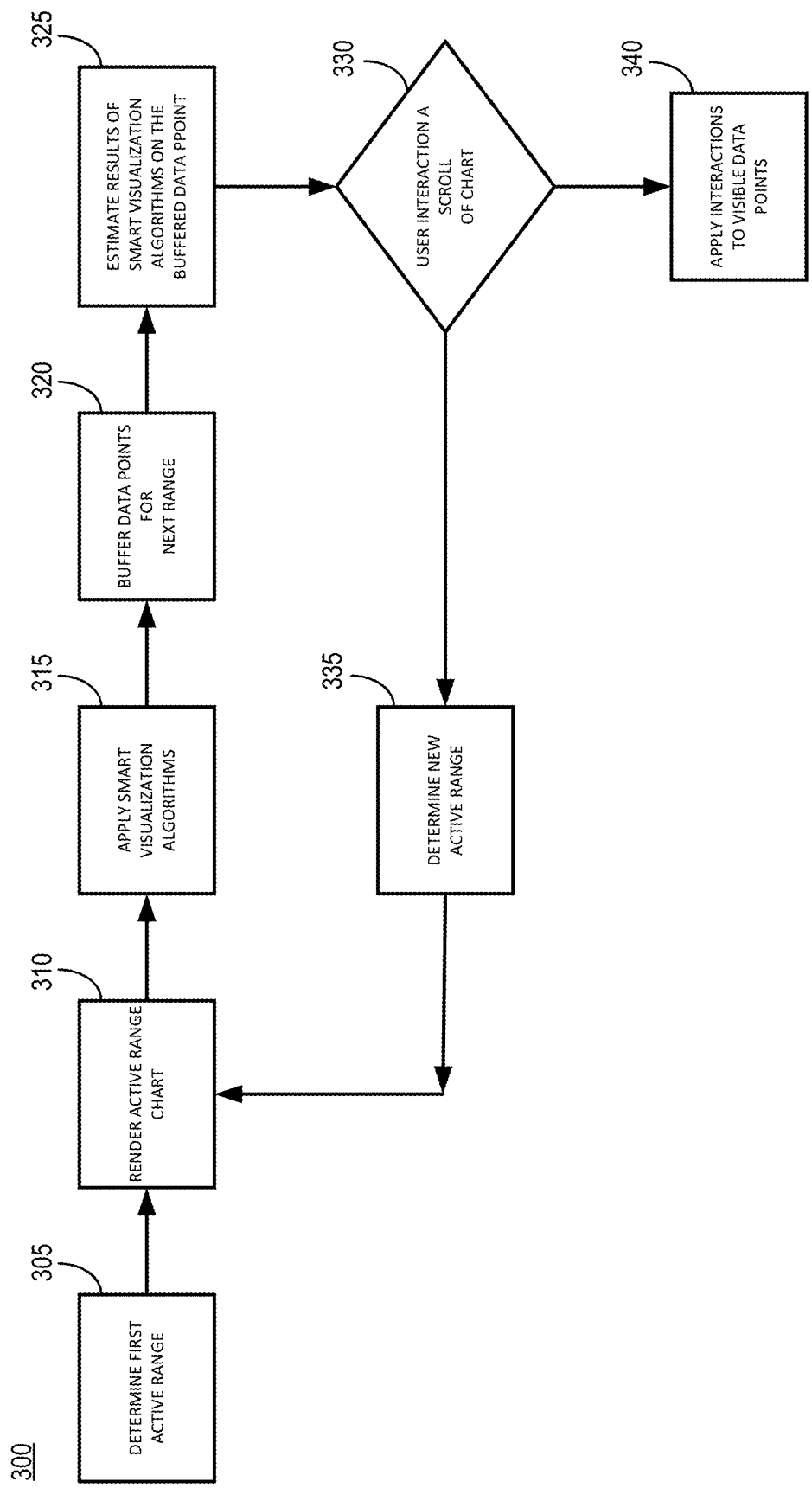
FIG. 3 is an example flow diagram of some aspects of a process herein.

FIG. 3 is an example flow diagram of a process 300, in accordance with some embodiments herein. Process 300 may begin at an initial operation 305. At operation 305, a first active range for a visualization regarding a set of data including a plurality of data points is determined. Operation 305 may be invoked in response to a request for a visualization. The request may be generated by or at least in response to a user interacting with at least one of an application, a service, a server, a system, and an apparatus. The request is not explicitly shown in FIG. 1 but is understood to occur, by some method. In one example, the request may be from an application executing on a user's mobile computing device and interacted with by the user such that the application generates a request to a graphic visualization service for a visualization including a graphical chart (e.g., a bar chart, a line chart, an area chart, etc.) of the sales of a range of products of an organization that occurred over the previous 5 years by various individuals and business organizations. The data results (i.e., data points) for such a request may number in the thousands (or tens of thousands) for a large enterprise.

Determining the first active range for a visualization regarding a set of data including a plurality of data points may be based on, for example, a chart container size. A chart container size might coincide with a display window in some embodiments herein. In such a case, the number of data points that can be reasonably displayed in the display window may represent an optimal number of data point representations that can be included in the visualization and still be legible by a consumer of the visualization (i.e., an end-user of an application or service). The optimal number of data points might be determined based on one or more of a chart container size, an intended display size, a design standard (e.g., a design standard from a 3rd-party organization such as International Business Communication Standards, IBCS).

Having determined the optimal number of data points that can be included in a rendering, as indicated by the determining of an active range of the data points from the overall full extent of the data points at operation 305, process 300 proceeds to operation 310 where the current active range is rendered. The visualization rendered at operation 310 only includes that data points in the active range. In some regards, the active range coincides with the data points that are visible to a user via a viewport or display window into the full range of data.

Operation 315 includes applying one or more smart visualization optimization algorithms to the rendered data points. That is, apply the smart visualization optimization(s) to the rendered data points. The rendered data points may be presented as different types of graphical UI element representations. The graph types may include, one or more of a bar graph, column graph, a waterfall graph, a histogram, a frequency distribution, a pie graph, a line graph, a scatter graph, and other types of graphs.

At operation 320, data points for a next page of the visualization may be stored in a buffer memory. The buffer may be populated with data points neighboring the data points determined in operation 305. The neighboring data points may be considered a likely next page because a user might navigate to a page containing data points near the data points in the current page by scrolling forward or backwards through the data from a current location/view of the data (as indicated by the viewport onto the data).

In some embodiments, the data points generated and rendered in operations 310 and 315 are Scalable Vector Graphics (SVG) elements that are added to a Document Object Model (DOM) representation including a visualization, where a reference to the SVG elements is stored in a buffer memory for a fast future access. For the data points of the next page as determined at operation 320, these elements may only be available in the buffer memory, without being attached to the DOM tree structure model. In some aspects, this may operate to keep the HTML DOM structure model more compact and efficient. While SVG elements might be relatively expensive to create and use, they can be immediately rendered on a display screen.

At operation 325, an estimation of an application of the smart visualization optimizations of operation 315 is determined. The estimation is performed on the data points (e.g., SVG elements) in the buffer memory (i.e., buffer) with the results of the estimation also being stored in the buffer. In some embodiments, one heap memory is provided for a client application and the buffer is an allocated segment of it that is used for performance improvement. Also, only a limited portion of the data points are rendered at operation 310, thereby using only a portion of the processing resources that would have been required to render all of the data points associated with the visualization. Additionally, the estimation performed at operation 325 is not a full calculation or determination like that performed at operation 315. As such, the amount of resources and time to complete the estimation (s) is likely less than a full actual determination. By performing the estimation for a next (likely) page(s), the next pages might be rendered quickly if/when the processes or systems herein are called to do such.

At operation 330, an interaction is received from the user and a determination is made as to whether the determination is a scrolling action or some other interaction with the displayed data point representations. If a scrolling action, then the user advances the display window or viewport to at least some new data point representations. As such, the new data point representations need to now be rendered. The process 300 will now rendered the new data point representations by incrementing the already rendered data points with the new data points' rendering. Process 300 returns to operation 310 as shown and completes that operation as done previously. Next, at operation 315, the process will either apply the smart visualization optimizations to the new data points if they are being considered for a first time or either use the estimate of the optimizations if the new data points were previously considered in a "next" page and stored in the buffer memory with their estimation.

Process 330 proceeds to operation 340 if the interaction determination of operation 330 concludes the interaction was not a scrolling action. As such, the interaction is with the data point representations visible through the viewport and the actions of the interactions are executed.

Figure 4:
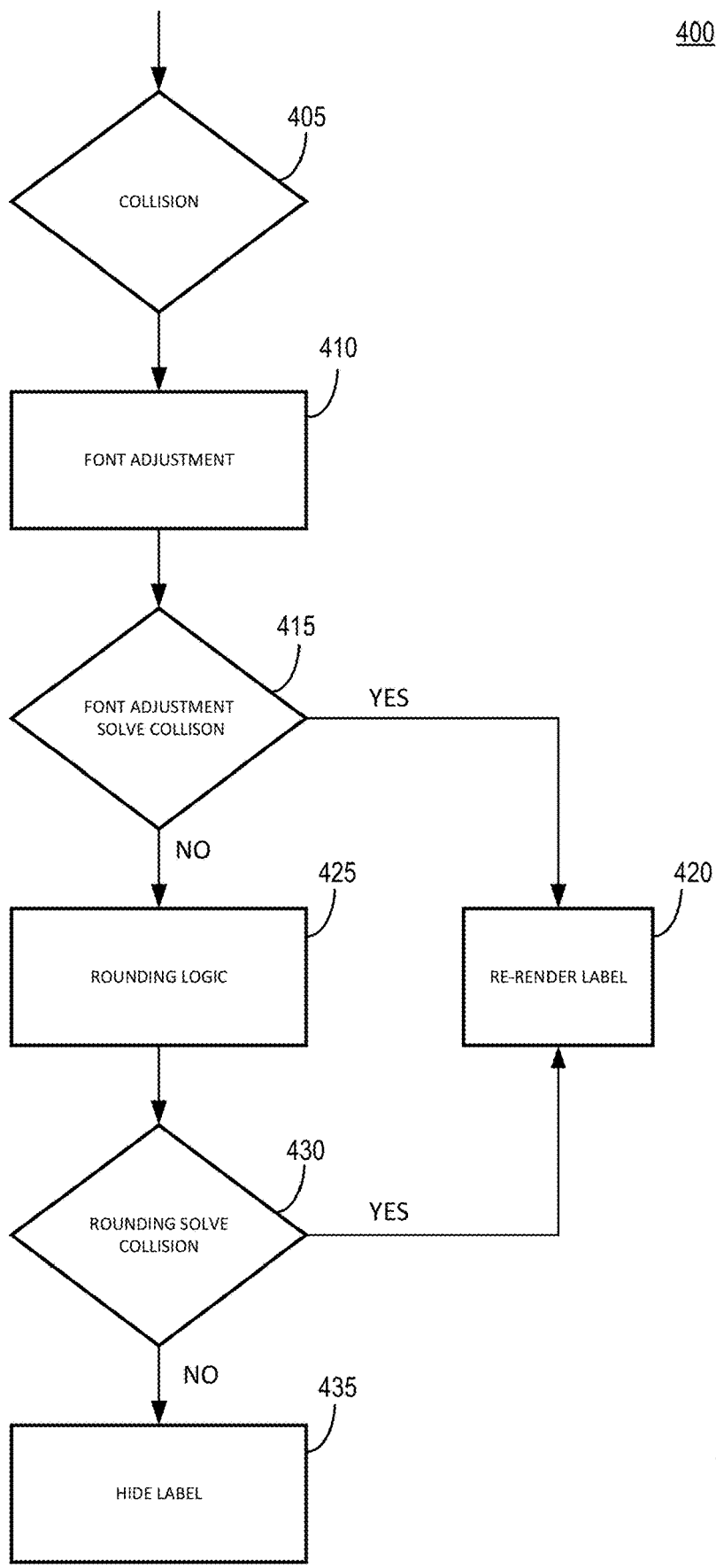
FIG. 4 is another example flow diagram of a process.
Figure 5:
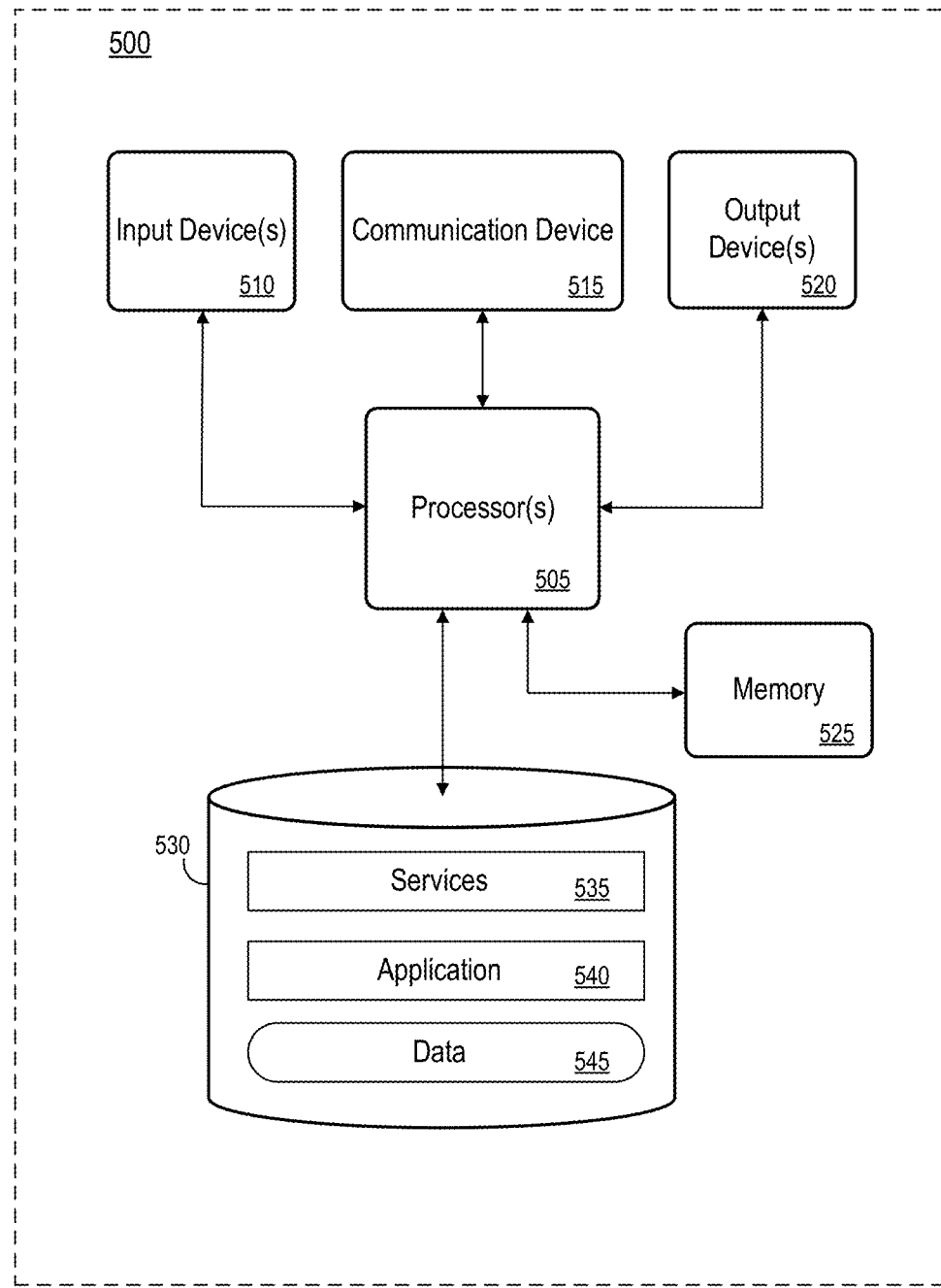
FIG. 5 is a block diagram of an apparatus, according to some embodiments.

FIG. 4 is a flow diagram of a process 400 related to the smart visualization optimizations herein, in one embodiment. Process 400 includes three types of optimization processes, including a collision process 405, a font adjustment process 415, and a round logic process 430. If a collision (e.g., overlap or other obstruction) is detected between neighboring labels in a rendered visualization at 405, the process moves to operation 410. At operation 410, the size of the font used for the labels is adjusted—made smaller or lager. If the font adjustment solves the collision problem as determined at 415, then the process advances to operation 420 and the affected text is re-rendered with the adjusted fonts. If the font adjustment does not solve the collision issue, then the process advances to a rounding logic optimization process at operation 425. If the rounding logic solves the collision problem as determined at 430, then the process advances to operation 420 and the affected text is re-rendered with the adjusted fonts and the rounding of the numerics therein. If the rounding logic does not solve the collision issue, then the process advances to operation 435 where the offensive label may be hidden.

Process 400 may include more, fewer, or alternative optimization processes. One such alternative process is a color contrast optimization process that may be used to enhance a contrast between colors of neighboring labels. Such a process may alleviate the need to otherwise move or adjust neighboring labels in a visualization.

Apparatus 500 includes processor 505 operatively coupled to communication device 520, data storage device 530, one or more input devices 510, one or more output devices 520 and memory 525. Communication device 515 may facilitate communication with external devices, such as a reporting client, or a data storage device. Input device(s) 510 may comprise, for example, a keyboard, a keypad, a mouse or other pointing device, a microphone, knob or a switch, an infra-red (IR) port, a docking station, and/or a touch screen. Input device(s) 510 may be used, for example, to enter information into apparatus 500. Output device(s) 520 may comprise, for example, a display (e.g., a display screen), a speaker, and/or a printer.

Data storage device 530 may comprise any appropriate persistent storage device, including combinations of magnetic storage devices (e.g., magnetic tape, hard disk drives and flash memory), optical storage devices, Read Only Memory (ROM) devices, etc., while memory 525 may comprise Random Access Memory (RAM), Storage Class Memory (SCM) or any other fast-access memory.

Services 535 and application 540 may comprise program code executed by processor 505 to cause apparatus 500 to perform any one or more of the processes described herein (e.g., FIGS. 3 and 4). Embodiments are not limited to execution of these processes by a single apparatus.

Data 545 (either cached or a full database) may be stored in volatile memory such as memory 525. Data storage device 530 may also store data and other program code and instructions for providing additional functionality and/or which are necessary for operation of apparatus 500, such as device drivers, operating system files, etc.

The foregoing diagrams represent logical architectures for describing processes according to some embodiments, and actual implementations may include more or different components arranged in other manners. Other topologies may be used in conjunction with other embodiments. Moreover, each component or device described herein may be implemented by any number of devices in communication via any number of other public and/or private networks. Two or more of such computing devices may be located remote from one another and may communicate with one another via any known manner of network(s) and/or a dedicated connection. Each component or device may comprise any number of hardware and/or software elements suitable to provide the functions described herein as well as any other functions. For example, any computing device used in an implementation of a system according to some embodiments may include a processor to execute program code such that the computing device operates as described herein.

All systems and processes discussed herein may be embodied in program code stored on one or more non-transitory computer-readable media. Such media may include, for example, a floppy disk, a CD-ROM, a DVD-ROM, a Flash drive, magnetic tape, and solid state Random Access Memory (RAM) or Read Only Memory (ROM) storage units. Embodiments are therefore not limited to any specific combination of hardware and software.

Embodiments described herein are solely for the purpose of illustration. Those in the art will recognize other embodiments may be practiced with modifications and alterations to that described above.

What is claimed is:
1. A system comprising:
   a memory storing processor-executable instructions; and
   a processor to execute the processor-executable instructions to cause the system to:
   receive a request to render a visualization, the visualization to include a plurality of data point representations;
   determine an optimal number of data point representations to include on a first page of the visualization;
   render an active range of the plurality of data point representations on the first page of the visualization;

apply at least one post-rendering optimization to the rendered first page;
determine an estimation of an application of the at least one post-rendering optimization to a next page of the visualization;
store the estimation of the application of at the least one post-rendering optimization to the next page of the visualization in a buffer memory; and
display the rendered first page having the at least one post-rendering optimization applied thereto.

2. The system of claim 1, wherein the optimal number of data point representations to include on a first page of the visualization is based on at least one of a chart container size, a design standard, and a combination thereof.

3. The system of claim 1, wherein the plurality of data point representations comprises one or more of a bar graph, a column graph, a waterfall graph, a histogram, a frequency distribution, a line graph, a pie graph, and a scatter graph.

4. The system of claim 3, wherein the at least one post-rendering optimization includes at least one of a label collision optimization, a label font adjustment optimization, a numeric rounding optimization, and a color contrast optimization.

5. The system of claim 1, wherein the data points corresponding to the next page are stored in the buffer memory.

6. The system of claim 1, wherein the processor is further enabled to execute the processor-executable instructions to cause the system to:
receive an indication of a user interaction with the display of the rendered first page;
determine whether the user interaction is indicative of a scrolling action to display at least one new data point representation; and
in response to the user interaction being indicative of the scrolling action, render the at least one new data point representation.

7. The system of claim 6, wherein the at least one new data point representation is stored in the buffer memory, the processor is further enabled to execute the processor-executable instructions to cause the system to:
apply the estimation of an application of the at least one post-rendering optimization; and
display the rendered at least one new data point representation having the estimation applied thereto.

8. The system of claim 6, wherein the processor is further enabled to execute the processor-executable instructions to cause the system to:
in response to the user interaction not being indicative of the scrolling action, apply the user interaction to the rendered first page of the visualization.

9. A non-transitory computer-readable medium storing program instructions executable by a processor of a computing system, the medium comprising:
instructions to receive a request to render a visualization, the visualization to include a plurality of data point representations;
instructions to determine an optimal number of data point representations to include on a first page of the visualization;
instructions to render an active range of the plurality of data point representations on the first page of the visualization;
instructions to apply at least one post-rendering optimization to the rendered first page;
instructions to determine an estimation of an application of the at least one post-rendering optimization to a next page of the visualization;
instructions to store the estimation of the application of at the least one post-rendering optimization to the next page of the visualization in a buffer memory; and
instructions to display the rendered first page having the at least one post-rendering optimization applied thereto.

10. The medium of claim 9, wherein the optimal number of data point representations to include on a first page of the visualization is based on at least one of a chart container size, a design standard, and a combination thereof.

11. The medium of claim 9, wherein the plurality of data point representations comprises one or more of a bar graph, a column graph, a waterfall graph, a histogram, a frequency distribution, a line graph, a pie graph, and a scatter graph.

12. The medium of claim 11, wherein the at least one post-rendering optimization includes at least one of a label collision optimization, a label font adjustment optimization, a numeric rounding optimization, and a color contrast optimization.

13. The medium of claim 9, wherein the data points corresponding to the next page are stored in the buffer memory.

14. The medium of claim 9, wherein the medium further comprises:
instructions to receive an indication of a user interaction with the display of the rendered first page;
instructions to determine whether the user interaction is indicative of a scrolling action to display at least one new data point representation; and
instructions to, in response to the user interaction being indicative of the scrolling action, render the at least one new data point representation.

15. The medium of claim 14, wherein the at least one new data point representation is stored in the buffer memory, the medium further comprises:
instructions to apply the estimation of an application of the at least one post-rendering optimization; and
instructions to display the rendered at least one new data point representation having the estimation applied thereto.

16. The medium of claim 14, wherein the medium further comprises:
instructions to, in response to the user interaction not being indicative of the scrolling action, apply the user interaction to the rendered first page of the visualization.

17. A method comprising:
receiving, by a processor, a request to render a visualization, the visualization to include a plurality of data point representations;
determining, by the processor, an optimal number of data point representations to include on a first page of the visualization;
rendering, by the processor, an active range of the plurality of data point representations on the first page of the visualization;
applying, by the processor, at least one post-rendering optimization to the rendered first page;
determining, by the processor, an estimation of an application of the at least one post-rendering optimization to a next page of the visualization;
storing, by the processor, the estimation of the application of at the least one post-rendering optimization to the next page of the visualization in a buffer memory; and
displaying, by the processor, the rendered first page having the at least one post-rendering optimization applied thereto.

18. The method of claim 17, wherein the data points corresponding to the next page are stored in the buffer memory.

19. The method of claim 17, further comprising:
receiving, by the processor, an indication of a user interaction with the display of the rendered first page;
determining, by the processor, whether the user interaction is indicative of a scrolling action to display at least one new data point representation; and
rendering, by the processor in response to the user interaction being indicative of the scrolling action, the at least one new data point representation.

* * * * *